(12) United States Patent
Holappa et al.

(10) Patent No.: US 8,506,719 B2
(45) Date of Patent: Aug. 13, 2013

(54) ROBOTIC SUBMERSIBLE CLEANING SYSTEM

(75) Inventors: Kenneth Walter Holappa, Angora, MN (US); Donald T. Darling, Palm Beach Gardens, FL (US); William Martin Hertel, III, Annapolis, MD (US)

(73) Assignee: SeaRobotics Corporation, Palm Beach Gardens, FL (US)

( * ) Notice: Subject to any disclaimer, the term of this patent is extended or adjusted under 35 U.S.C. 154(b) by 205 days.

(21) Appl. No.: 12/952,973

(22) Filed: Nov. 23, 2010

(65) Prior Publication Data

US 2012/0006352 A1    Jan. 12, 2012

Related U.S. Application Data

(60) Provisional application No. 61/263,680, filed on Nov. 23, 2009.

(51) Int. Cl.
*B08B 7/00* (2006.01)
*B63B 59/00* (2006.01)

(52) U.S. Cl.
USPC .................................. 134/6; 134/18; 114/222

(58) Field of Classification Search
None
See application file for complete search history.

(56) References Cited

U.S. PATENT DOCUMENTS

| | | | |
|---|---|---|---|
| 732,052 A | 6/1903 | Johnson | |
| 3,810,515 A | 5/1974 | Ingro | |
| 3,859,948 A | 1/1975 | Romano | |
| 3,922,991 A * | 12/1975 | Woods | 114/222 |
| 3,926,277 A | 12/1975 | Shino et al. | |
| 3,958,652 A * | 5/1976 | Urakami et al. | 180/7.1 |
| 4,011,827 A | 3/1977 | Fond | |
| 4,401,048 A | 8/1983 | Rogers | |
| 4,604,960 A | 8/1986 | Wachi | |
| 4,697,536 A | 10/1987 | Hirata | |
| 5,014,803 A | 5/1991 | Urakami | |
| 5,174,222 A | 12/1992 | Rogers | |
| 5,730,553 A | 3/1998 | Miura et al. | |
| 5,852,984 A * | 12/1998 | Matsuyama et al. | 114/222 |
| 5,947,051 A * | 9/1999 | Geiger | 114/313 |
| 6,536,272 B1 * | 3/2003 | Houston et al. | 73/170.29 |
| 6,564,815 B2 * | 5/2003 | McGuire | 134/104.4 |
| 7,500,441 B2 | 3/2009 | Van-Zwol | |
| 7,971,547 B1 * | 7/2011 | Hertel et al. | 114/222 |
| 2001/0013434 A1 * | 8/2001 | Hopkins | 180/7.1 |

FOREIGN PATENT DOCUMENTS

FR    1558592 B    1/1968

* cited by examiner

*Primary Examiner* — Nicole Blan
(74) *Attorney, Agent, or Firm* — Duane Morris LLP

(57) ABSTRACT

A cleaning system includes a chassis supporting a propulsion system for propelling the cleaning system across a surface. At least one sensor of a first type is coupled to the chassis, and a surface engagement mechanism is configured to maintain the cleaning system coupled to the surface as the propulsion system propels the cleaning system across the surface. A cleaning device is coupled to the chassis and configured to abrade the fouling from the surface, and a controller coupled to the chassis and in signal communication with the propulsion system and the first sensor. The controller is configured to receive a signal from the at least one sensor of the first type and control the propulsion system in response to the signal.

18 Claims, 18 Drawing Sheets

ROBOTIC SUBMERSIBLE CLEANING SYSTEM

CROSS-REFERENCE TO RELATED APPLICATIONS

This application claims priority to U.S. Provisional Patent Application No. 61/263,680, filed on Nov. 23, 2009, the entirety of which is herein incorporated by reference.

STATEMENT OF GOVERNMENT INTEREST

This invention was made with Government support under contract N00167-05-M-0362 awarded by NAVSEA NSWC Carderock Division, contract N00014-06-C-0133 awarded by the Office of Naval Research, contract N65538-08-M-0158 awarded by the Naval SeaLogistics Center (SBIR), and contract N00014-09-C-0852 awarded by the Office of Naval Research. The Government may have certain rights in this invention.

FIELD OF DISCLOSURE

The disclosed system and method relate to anti-fouling of surfaces disposed in a fluid. More specifically, the disclosed system and method relate to a robotic cleaning system for cleaning a surface disposed in a fluid.

BACKGROUND

Fouling, i.e., the accumulation of unwanted material, of underwater ship hulls significantly degrades the performance of the ship by increasing hydrodynamic drag, which reduces the ship's maximum speed and fuel efficiency. Consequently, operating costs for ships with greater fouling on their hulls are greater than for ships with less fouling on their hulls.

It has been estimated that the Navy will save $30M-$60M per year in propulsive fuel as a result of cleaning biofouling. Current Navy waterborne hull cleaning methods include the deployment of remotely operated vehicles ("ROV") that are extremely large (approximately the size of a single-person submarine) to remove the biofouling by aggressive cleaning methods. Although this method is more efficient than dry-docking the vessels for partial or full removal and replacement of the vessel's underwater hull coating system, the method is still not ideal due to the high cost of the ROVs and their aggressive cleaning methods that frequently results in the release of toxins (Cu and Zn) into the surrounding waters.

SUMMARY

A cleaning system is disclosed that includes a chassis supporting a propulsion system for propelling the cleaning system across a surface. At least one sensor of a first type is coupled to the chassis, and a surface engagement mechanism is configured to maintain the cleaning system coupled to the surface as the propulsion system propels the cleaning system across the surface. A cleaning device is coupled to the chassis and configured to abrade the fouling from the surface, and a controller coupled to the chassis and in signal communication with the propulsion system and the first sensor. The controller is configured to receive a signal from the at least one sensor of the first type and control the propulsion system in response to the signal.

Also disclosed is a method of cleaning a surface of a hull disposed under a surface of a liquid. The method includes a) determining a first frequency with which to clean a surface of the hull, b) coupling a cleaning system according to claim 1 to the surface of the hull, and c) powering on the cleaning system. Steps b) and c) are repeated in accordance with the first frequency.

In some embodiments, a cleaning system for cleaning hull of a vehicle beneath a surface of a liquid in which the hull is submerged includes a chassis, a drive system supported by the chassis configured to move the cleaning system along the hull, and a surface engagement mechanism configured to maintain the cleaning system coupled to the hull of the vehicle as the propulsion system propels the cleaning system across the hull. A first sensing system is supported by the chassis and configured to measure a level of chlorophyll and determine a level of fouling on the hull based on the level. A cleaning device is coupled to the chassis and configured to abrade the biofouling from the hull as the cleaning system, and a controller is coupled to the chassis and in signal communication with the propulsion system, the first sensing system, and a plurality of navigation sensors. The controller is configured to receive data from the first sensing system and the plurality of navigation sensors and control the propulsion system in response to the signal received from the sensor.

A method of cleaning a surface of a hull disposed under a surface of a liquid is also disclosed in which a cleaning device is coupled to a chassis and maintains in contact with the surface of the hull using a surface engagement mechanism supported by the chassis. The chassis is propelled across the surface of the hull by a propulsion system supported by the chassis. The surface of the hull is abraded by a cleaning device coupled to the chassis.

DETAILED DESCRIPTION

Thresholds established for requiring waterborne hull cleaning seek to balance the need to maintain operational readiness and lower life cycle costs while minimizing the release of coating constituents and biofouling into surrounding waters. A full hull cleaning of antifouling coatings is prescribed when the foul rating for the hull is 40 or greater over 20% or more of the hull's area. Due to ship availabilities and operational schedules, underwater ("UW") hull cleaning cannot always occur when fouling is at the minimum level to initiate a cleaning. In addition, frequent cleaning with current methods will produce excessive wear of the AF paint, resulting in premature failure. A review of hull cleaning records conducted by NSWCCD indicates that approximately 26.5% of ships painted with the Navy's current ablative antifouling (AF) coatings that undergo hull cleaning have heavy fouling (fouling rating equal to or greater than 80) on some portion of their hull. Reducing the mean level of fouling on active ships will generate additional operational savings and environmental benefits that are beyond that achieved using current hull cleaning methods and best management practices.

Effective cleaning of early base fouling (i.e., slime or biofilm layer) on submerged underwater ship hulls may minimize the release of toxicants into surrounding waters by reducing the periodicity of more aggressive, brush-type hull cleanings. The approach will also significantly reduce the colonization and transport of unwanted fouling species by disrupting the attachment process. The HullBUG cleaning system described herein encompasses technology for a cleaning device, surface adhesion, cleaning capability, hull navigation, path planning, data telemetry, internal power, power replenishment, and operations support (i.e., launch and recovery, monitoring status and recharging). Additionally, the HullBUG cleaning system is optimized for vehicle size and vehicle/technology life expectancy, to meet the targeted objectives.

One or more hull crawlers or 'bugs' are provided and configured to operate in a coordinated fashion using various means of assessing their relative position and operating status. Attachment of the bugs to the hull or other surface is achieved through pressure differential methods and magnetic attachment. Magnetic attachment offers low energy consumption and is implemented to not impart an unacceptable magnetic signature to the steel hull for Navy applications. Pressure differential methods alone require energy and so may result in the loss of a cleaning vehicle should power be lost. This HullBUG cleaning system may use a pressure differential attachment, magnetic attachment, or both methods for hull attachment.

Figure 1:
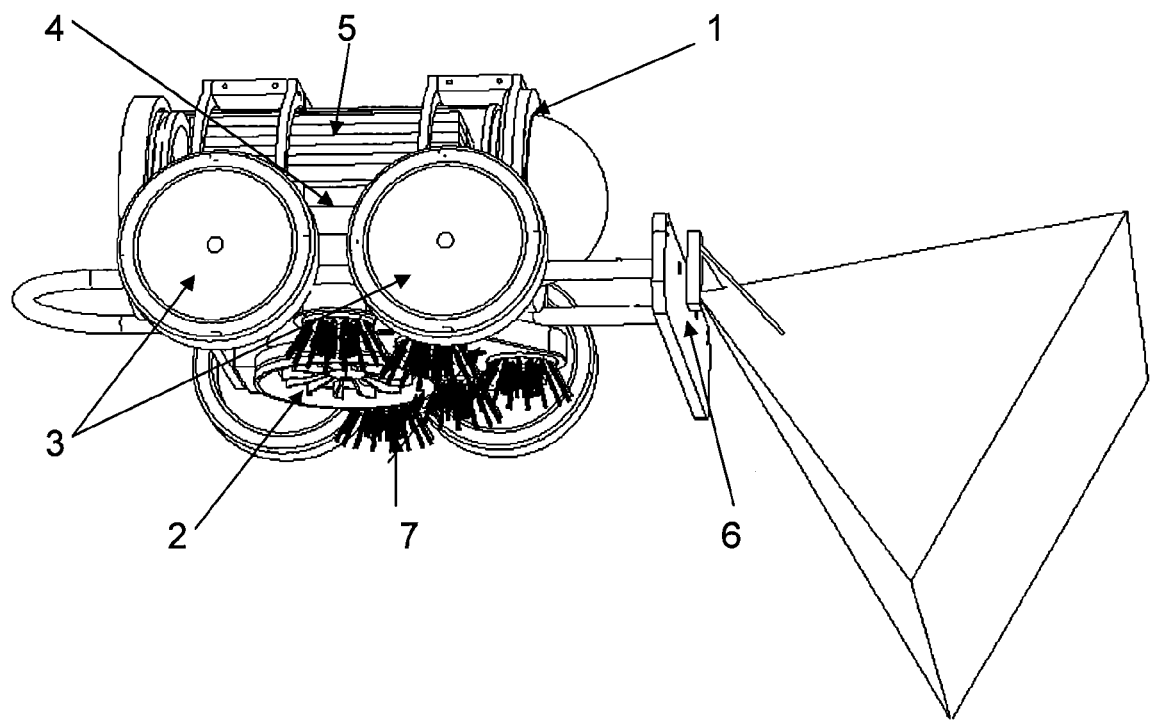
FIG. 1 shows the system components of one example of a HullBUG cleaning system.

In one embodiment, the HullBUG cleaning system is a small, man-portable vehicle of approximately 0.5 meters×0.6 meters×0.3 meters and weighing approximately 16 kg. As shown in FIG. 1 it is comprised of an internal structure 1, a single or multitude of attraction mechanisms 2, propulsion system 3, one or more computer systems 4, an energy storage module 5, a sensing and navigation system 6 and a cleaning apparatus 7.

A multiprocessor computer system provides an autonomous cleaning capability. On-board computers control the wheel drive system or propulsion system, the attraction mechanism, monitor system health, and provide for vehicle guidance. One or more pressure sensors, proximity sensors, and various optical sensors provide feedback allowing the cleaning system to transit in an optimum manner. Through the combination of iso-barometric transit, surface-fouling monitoring, gravity vector monitoring, optical flow sensing and intelligent vision, the system's intelligent controller is able to optimize the cleaning rate and provide efficient full hull coverage.

The HullBUG system can be configured totally autonomous, with a tether, or with a wireless system. The tethered configuration and the wireless configuration allow the operator to view video feed back of the cleaning operation as it proceeds. The tethered configuration and the wireless configuration also allow the system to be used for real-time monitoring of video inspection. In the totally autonomous configuration a controller can be located inside or otherwise coupled to the chassis of the HullBUG while in the tethered and wireless configurations the controller may be remotely located.

Figure 24:
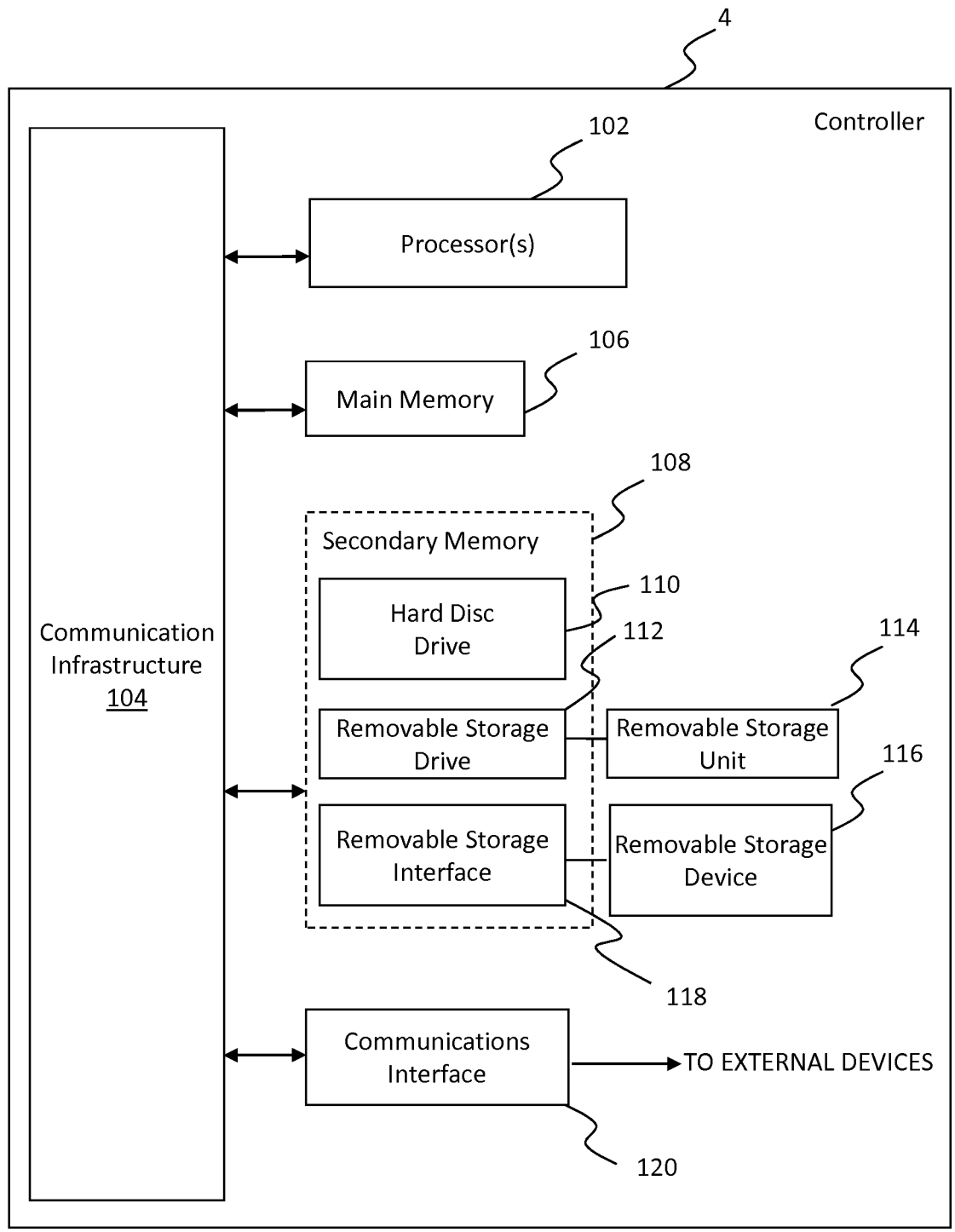
FIG. 24 is a block diagram of one example of a controller for controlling the HullBUG cleaning device.

In one embodiment, a controller 4 is located inside or otherwise coupled to the chassis of the cleaning system as shown in FIG. 1 and allows for totally autonomous operation. One example of an architecture of controller 4 is illustrated in FIG. 24. Controller 4 may be a computer or other computing device or devices that may be configured to send and receive data and perform the functions described herein. As shown in FIG. 24, controller 4 may include one or more processors 102, which may be connected to a wired or wireless communication infrastructure 104 (e.g., a communications bus, crossover bar, local area network ("LAN"), or wide area network ("WAN")). Processor 102 may be any central processing unit, microprocessor, micro-controller, computational device, or like device. Processor(s) 104 may be configured to run one or more multitasking operating systems.

Controller 4 may include a main memory 106, such as a random access memory ("RAM"). Controller 4 may also include or be in communication with a secondary memory 108 such as, for example, a hard disk drive 110 and/or removable storage drive 112, representing a floppy disk drive, a magnetic tape drive, an optical disk drive, or the like. The removable storage drive 112 may read from and/or write to a removable storage unit 114. Removable storage unit 114 may be a floppy disk, magnetic tape, CD-ROM, DVD-ROM, optical disk, blu-ray disk, ZIP™ drive, and the like, which may be written to and/or read by removable storage drive 112.

Removable storage unit 114 may include a machine readable storage medium having stored therein computer software and/or data.

In some embodiments, secondary memory 108 may include other similar devices for allowing computer programs or other instructions to be loaded into controller 4 such as a removable storage device 116 and a removable storage interface or socket 118. An example of such a removable storage device 116 and socket 118 includes, but is not limited to, a USB flash drive and associated USB port, respectively. Other removable storage devices 116 and interfaces 118 that allow software and data to be transferred from the removable storage device 116 to controller 4 may be used.

Controller 4 may also include a communications interface 120. Communications interface 120 allows software and data to be transferred between controller 4 and external devices, e.g., the sensors described below that provide data for aiding in navigation and biofouling detection. Examples of communications interface 120 may include a modem, a network interface (such as an Ethernet card), a wireless communication card, a communications port, a Personal Computer Memory Card International Association (PCMCIA) slot and card, or the like. Software and data transferred via communications interface 120 are in the form of signals which may be electronic, electromagnetic, optical, or any other signal capable of being received by communications interface 120. These signals are provided to communications interface 120 via a communications path or channel. The path or channel that carries the signals may be implemented using wire or cable, fiber optics, a telephone line, a cellular link, a radio frequency ("RF") link, and the like.

Figure 2:
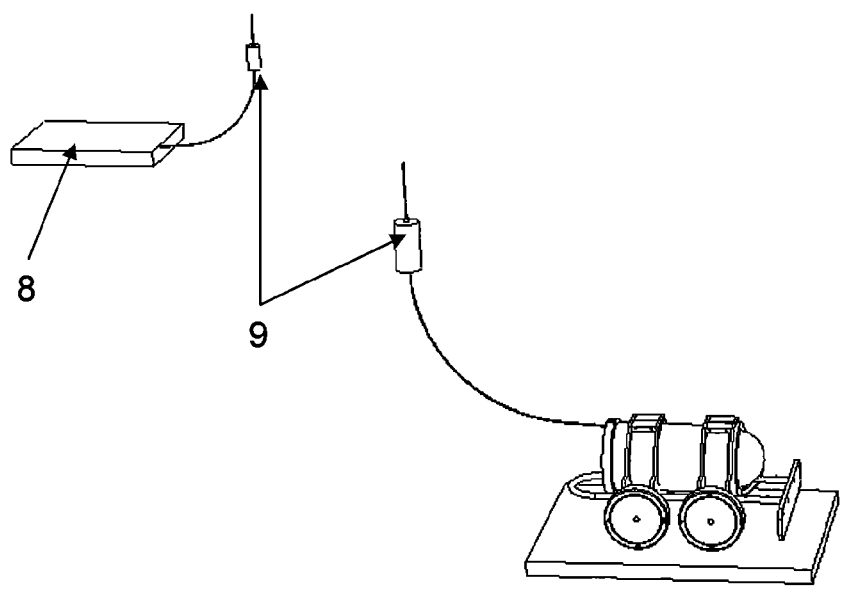
FIG. 2 illustrates the HullBUG cleaning system with a wireless link to a controller.
Figure 3:
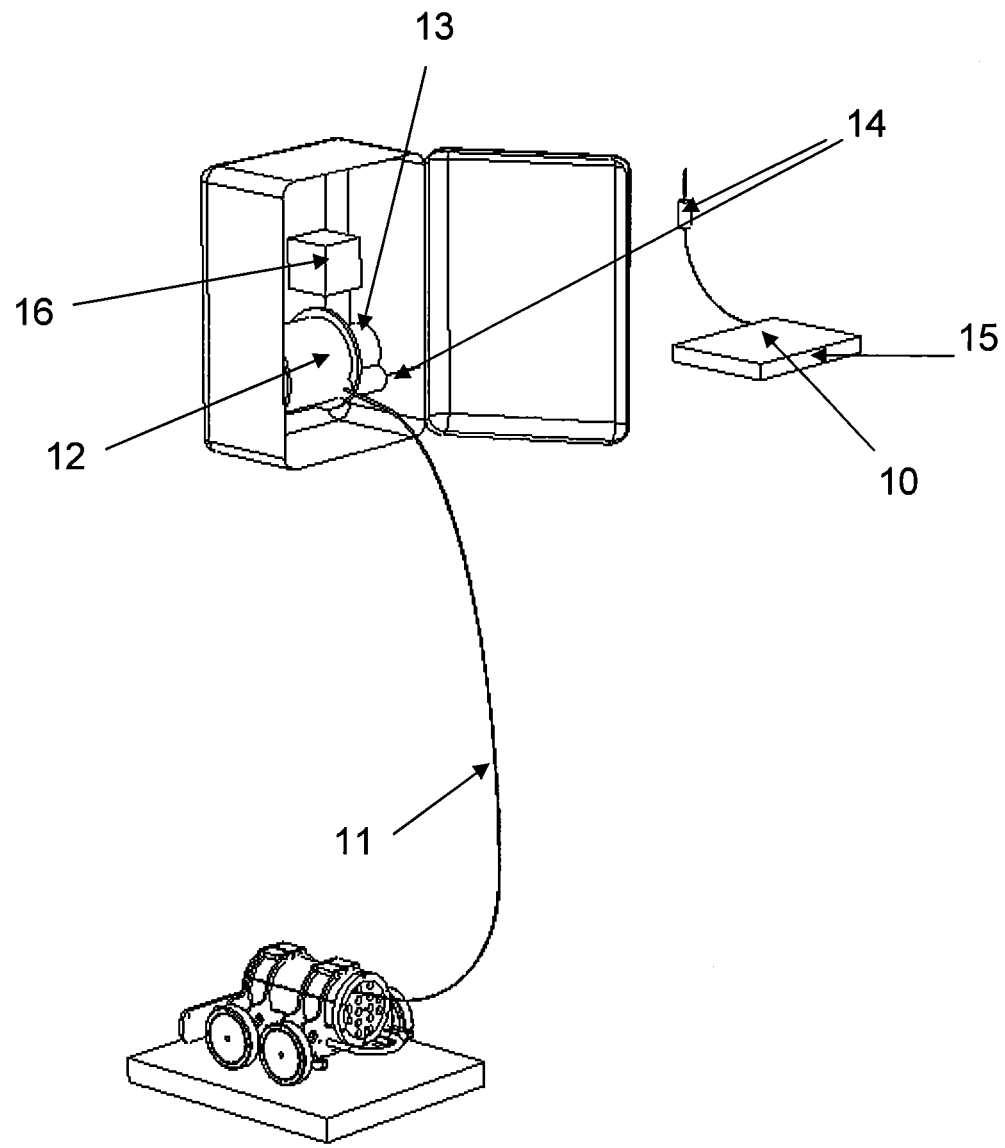
FIG. 3 illustrates one example of a HullBUG cleaning system configured with a tether management system.

In another embodiment a remotely coupled controller 8 is connected to the cleaning system through a wireless communication link 9 as shown in FIG. 2. In another embodiment a remotely coupled controller 10 is connected to the cleaning system through a tether 11 as shown in FIG. 3. In the tethered configuration the HullBUG is connected to the surface support station through a tether 11 to an operator interface system as shown in FIG. 2. This configuration may be used for development purposes and when operator feedback is desirable for inspection and or guidance purposes. The long tether cable is managed using a Tether Management System ("TMS") 12. The TMS uses a slip-ring assembly 13 to allow for reeling the cable in and out. The TMS cable drum has a wireless communication system 14 for transferring commands to the TMS from the topside computer and then down the tether to the vehicle. Similarly the vehicle can send communications and video back up the tether, across the wireless link and to the topside computer 15 where it can be displayed. Power can be supplied to the cleaning system through the tether from a power supply 16 located within the TMS. This power supply can recharge the energy storage module located within the vehicle and it can power the vehicle for operation.

Figure 4:
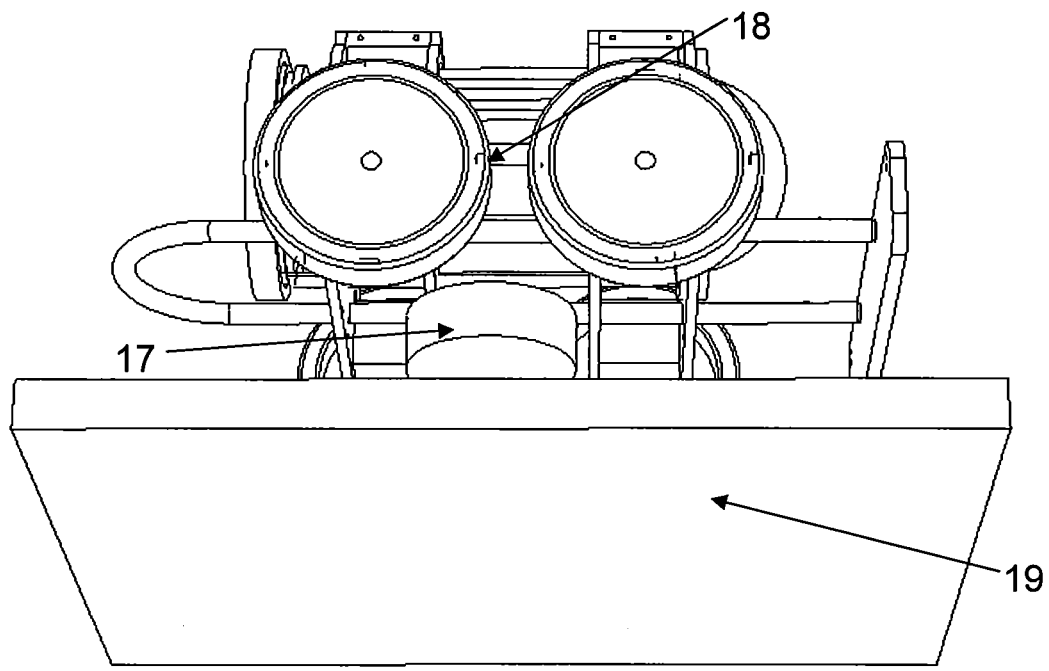
FIG. 4 illustrates one example of a HullBUG cleaning system with a stationary magnetic attachment.

The cleaning system attaches to the underwater surface with a surface engagement mechanism, which may include magnetic attraction, negative pressure based attraction, or both. In one embodiment, the surface engagement mechanism includes one or more magnets 17 attached to the bottom of the chassis 18 as shown in FIG. 4. The magnets are sized to maximize the attractive force while minimizing the magnetic residual imparted into certain Navy hulls. The magnetic attraction force provides a passive method of holding the system to the hull allowing maximum endurance on a fixed energy supply when transiting over a ferrous metal substrate 19 that is within a prescribed proximity to the magnets.

Figure 5:
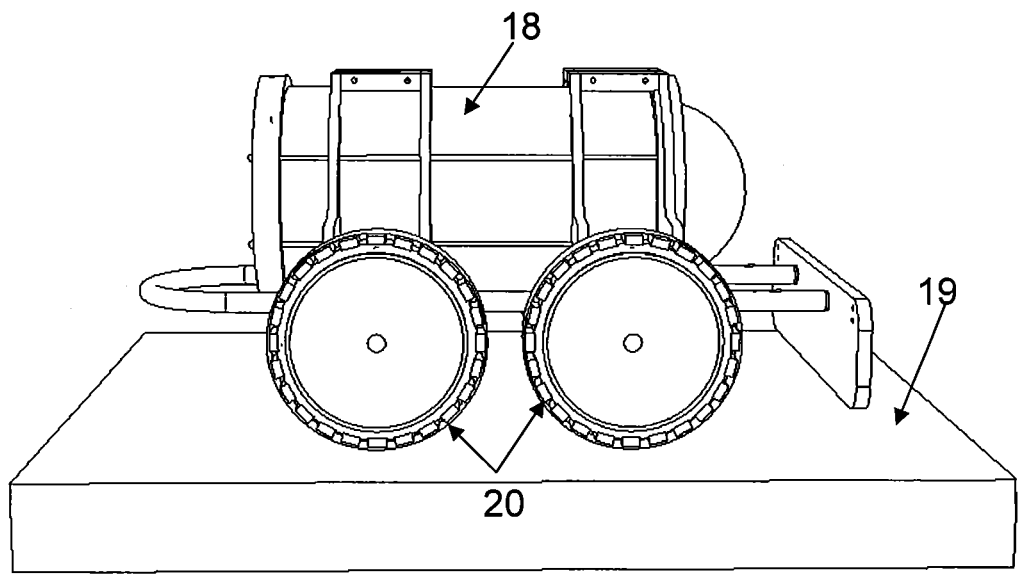
FIG. 5 illustrates one example of a HullBUG cleaning system with magnetic wheels.

In another embodiment the surface engagement mechanism includes a magnet or group of magnets integrated into the wheels 20 or tracks as shown in FIG. 5. A variety of magnetic arrangements are implemented including powerful ring magnets and more sophisticated multi-pole magnet arrangements. For example, the multi-pole magnet assemblies may include up to 24 pole pairs and generate a minimal residual magnetic signature. These magnet assemblies are further built into wheel assemblies and may be similar to the rotors used in permanent magnet brushless DC motors.

Figure 6:
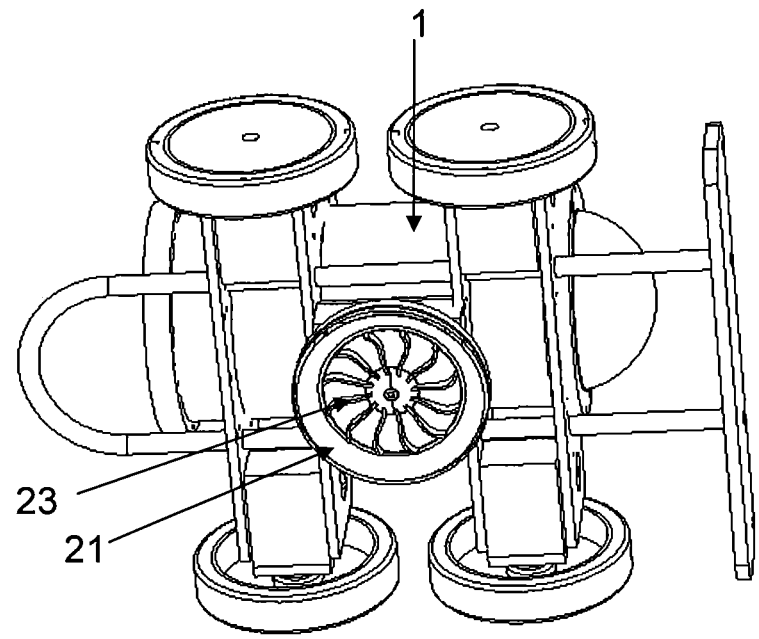
FIG. 6 illustrates one example of a HullBUG cleaning system configured with negative pressure device.

In another embodiment the HullBUG cleaning system utilizes a negative pressure mechanism 21 for attraction to the hull 19 shown in FIG. 6. This negative pressure source is comprised of a rotary mechanism 23, which provides an attractive force due to the dynamic motion of the fluid flow it generates. An example of such a negative pressure source is described in U.S. Pat. No. 5,194,032, which issued Mar. 16, 1993.

Figure 7:
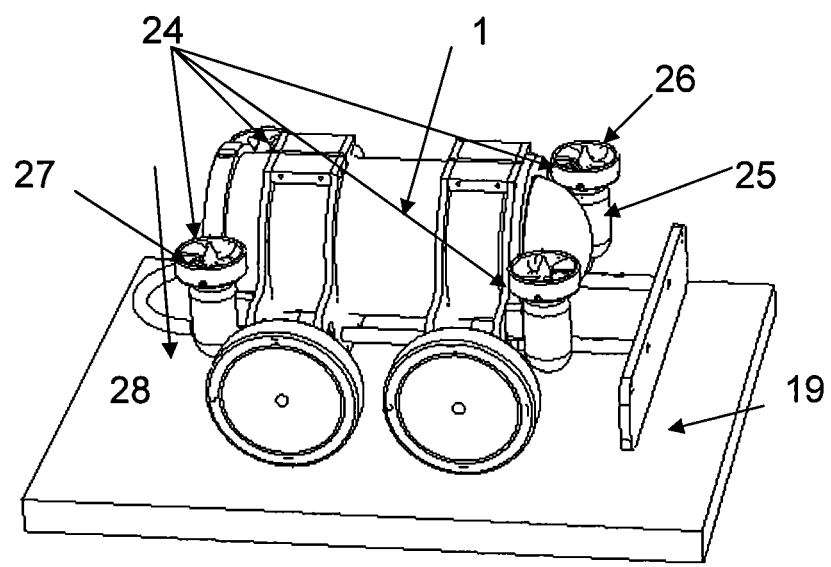
FIG. 7 illustrates one example of a HullBUG cleaning system configured with a propulsion system that includes thrusters.

In another embodiment, the cleaning system attaches to the surface 19 through the use of thrusters 24 that accelerate the fluid from a first side of the thruster 25 to a second side of the thruster 26 as shown in FIG. 7. An example of such commercially available thruster is the Model HPDC 1509 available from SeaRobotix Inc. of San Diego Calif. One skilled in the art will understand that other thrusters for use on Remote Operated Vehicles and utilize propellers 27 to accelerate the fluid and provide an axial force 28 may be implemented. The negative pressure based attraction can be used when transiting over non-ferrous substrates as well as providing a beneficial relationship between attractive force standoff distance. The negative pressure mechanisms are more tolerance of standoff distance than the magnetic attractors.

Figure 8:
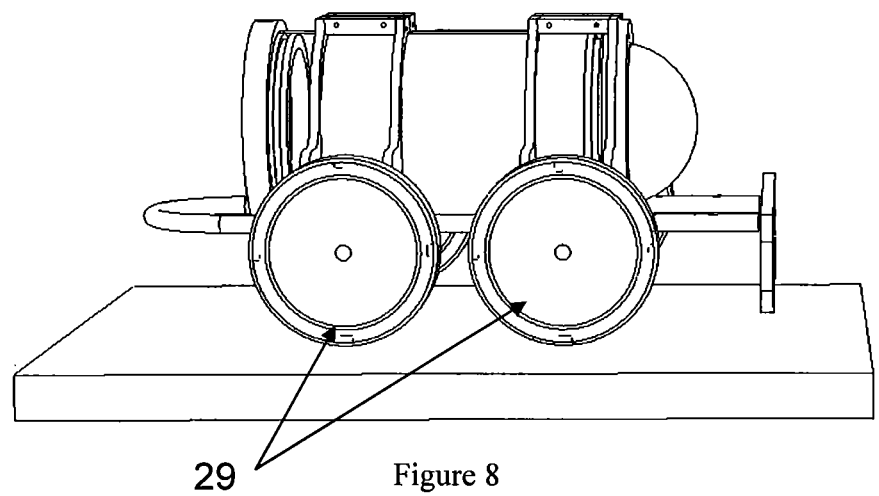
FIG. 8 illustrates one example of a HullBUG cleaning system configured with a propulsion system that includes rubber wheels.

In one embodiment, the propulsion system includes one or more wheels 29 as shown in FIG. 8. As shown in FIG. 8, a set of four driven wheels can be implemented, although one skilled in the art will understand that fewer or more wheels may be used. The wheels 29 are driven in a tank like fashion to achieve maneuvering. This system offers excellent traction and maneuvering.

Figure 9:
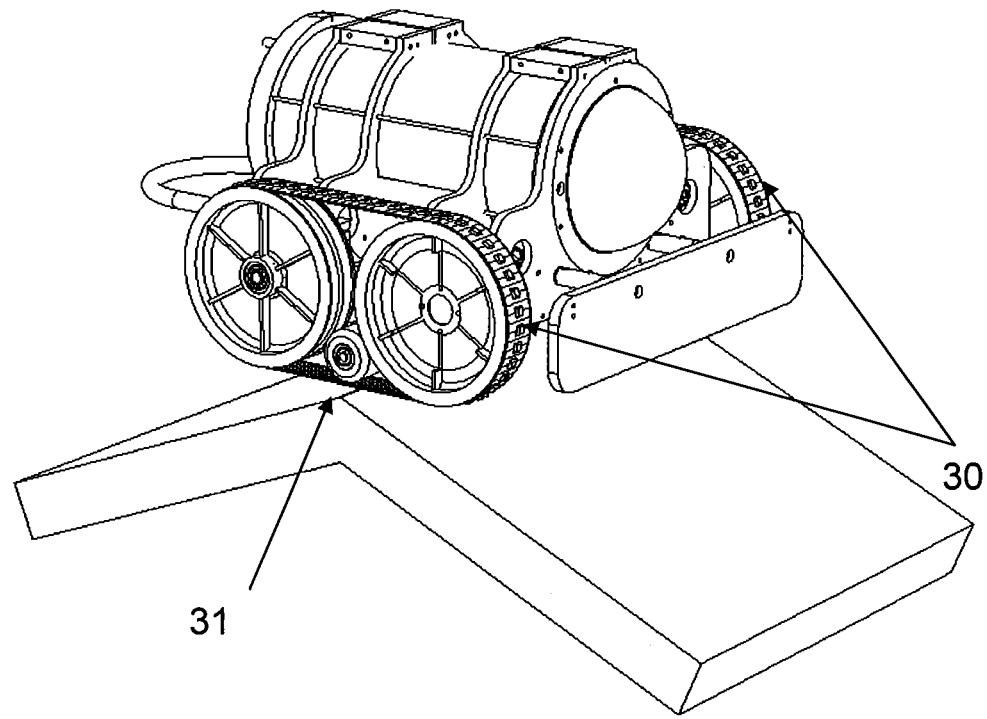
FIG. 9 illustrates one example of a HullBUG cleaning system configured with a propulsion system that includes a track system.

In another embodiment the propulsion system includes tracks 30 fitted to the drive system for use on hulls where crossing the angled intersection of relatively flat surfaces 31 is required such as a chine on the underwater surface of a ship and is shown in FIG. 9.

Figure 10:
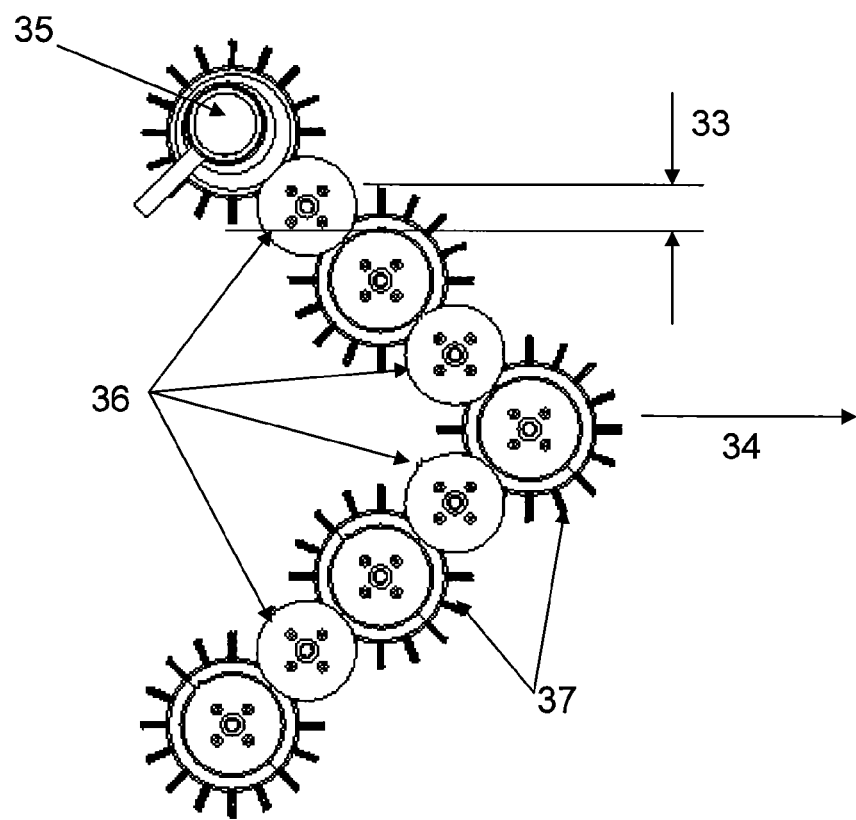
FIG. 10 illustrates one example of a HullBUG cleaning system with a cleaning mechanism that includes a vertical axis brush cleaner.
Figure 13:
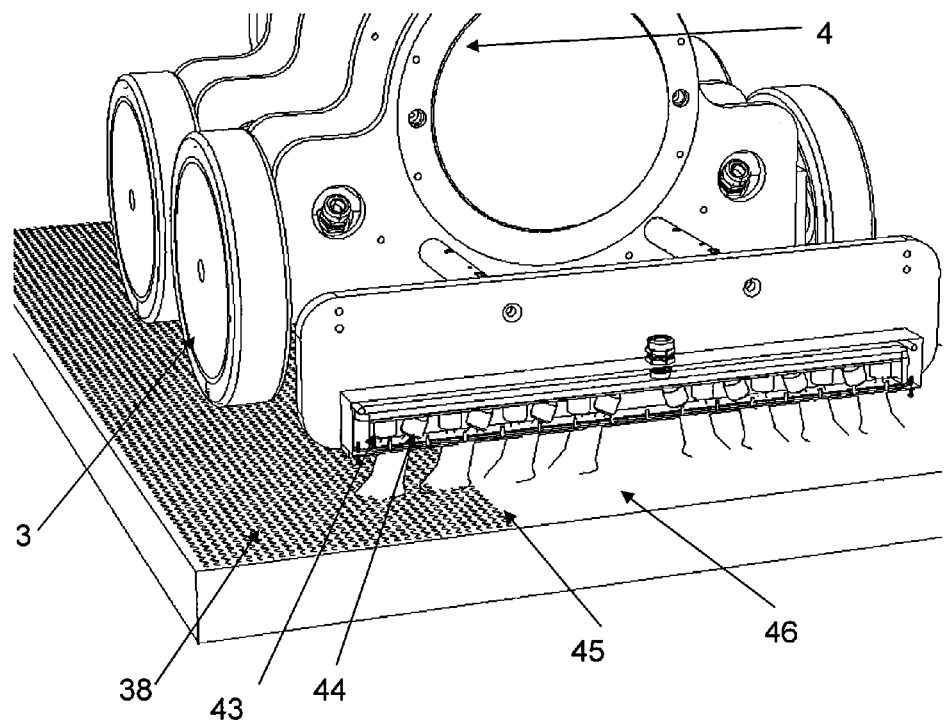
FIG. 13 illustrates one example of a HullBUG cleaning system with biofilm sensor array.

The cleaning system is configured with one or more cleaning devices for removing the biofilm from a surface, such as a surface of a hull of a boat. The system may include a sensor described below for measurement of the presence of biofilm and so the controller can control intensity of the cleaning action by controlling the speed of the cleaning device motor or pump as well as the applied pressure to the surface in response to the measured fouling level. In one embodiment, the cleaning device includes multiple vertical axis brushes 7 as shown in FIG. 1. As shown in FIG. 10, the rotary brushes are positioned so that there is overlap 33 of the cleaning action in the direction of forward motion 34. A motor 35 drives the brushes through a gear system 36 so that each brush spins about its respective central axis. The bristles 37 are positioned such that they are in contact with the surface of the ship 19 and remove any biofilm 38 (see FIG. 13) that may be on the surface.

Figure 11:
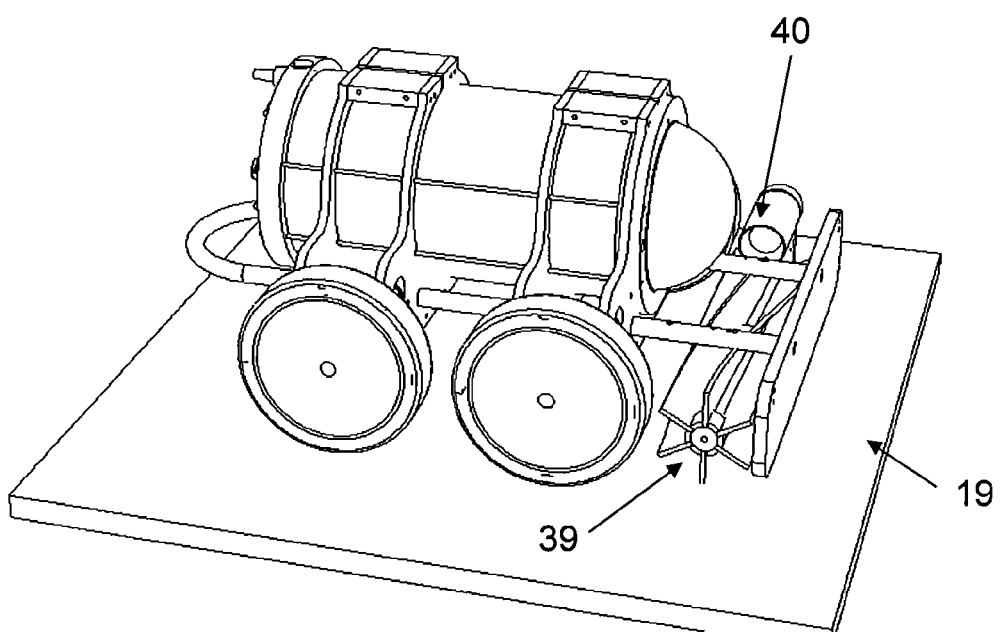
FIG. 11 illustrates one example of a HullBUG cleaning system with a cleaning mechanism that includes a horizontal squeegee cleaner.

In another embodiment, the cleaning mechanism utilized in the system can take the form of a forward rotating drum with horizontal axis of rotation, as shown in FIG. 11, such as the type of drum that is used in certain street sweepers. The cleaning device may also include one or more a rubber flaps or squeegees disposed on a horizontal axis 39 and driven by a motor 40.

Figure 12:
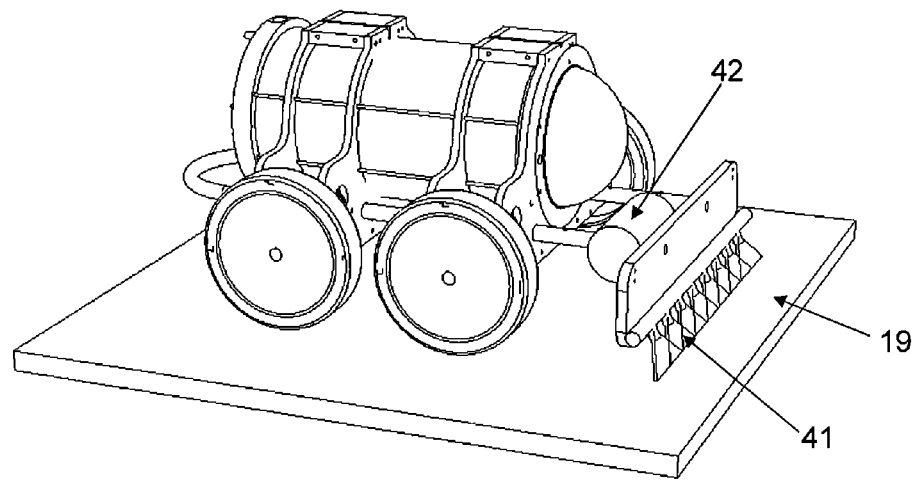
FIG. 12 illustrates one example of a HullBUG cleaning system having a device in the form of a plurality of jets.

In another embodiment the cleaning system uses multiple jets 41 to remove the biofilm 38 (see FIG. 13) as shown in FIG. 12. Multiple jets are used so that each jet can be kept as close as possible to the surface to be cleaned 19 without hanging on obstacles. A minimum distance is desirable due to the loss of jet velocity as the jet passes through the ambient fluid. A small pump 42 is used to take in ambient fluid and create sufficient pressure to allow removal of the biofilm. The jets are angled forward slightly and may include an oscillation mechanism as is typically found on industrial pressure washers. The jets, like all of the cleaning mechanisms, can be turned on by the controller during those times that the measured level of biofilm fouling is above some threshold.

One or more sensors are communicatively coupled to controller and provide data and information to controller for navigating the cleaning system along the surface. A unique sensing system is incorporated that can detect and measure the fouling level on the surface of the hull. This sensing system can provide a quantitative measurement of the extent and intensity of the biofilm. The sensing system can also provide navigation information to the controller for cleaning optimization. The system includes one or more sensors to detect the interface between a recently cleaned hull section and a hull section exhibiting increased fouling because it is not yet cleaned. Data collected by the sensing system is provided to the controller, which is used in a navigation algorithm thereby allowing for optimized area coverage of the hull. The sensing system utilizes a set of light sources and light detectors to identify line of demarcation between the cleaned hull surface versus The fouled hull surface by measuring the relative level of chlorophyll-A present in the biofilm. The sensing system has been tested on a barely visible biofilm and was able to detect the difference between the clean surface and the unclean surface.

In one embodiment, the sensing system includes a silicon photo diode light detector 43 or array of light detectors that identify the level of chlorophyll present in a biofilm 38 due to phenomena know as fluorescence. Chlorophyll is an indicator of biofilm and therefore measuring the level of chlorophyll provides an indication of the level of fouling. Chlorophyll level can be measured using red light detectors 43 at a typical wavelength of 675 nm by first illuminating the chlorophyll with a blue light emitting diode 44 at a typical wavelength of 480 nm and then measuring the red light returned. One skilled in the art will understand that other wavelengths may be used.

An array of chlorophyll level measuring light detectors 43 enables the determination of the edge 45 separating the fouled area of the surface 38 and the unfouled or cleaned area of the underwater surface 46. This information is provided to controller 4 and utilized to guide the cleaning system while propelled along the underwater surface 19 by propulsion system 3.

Figure 14:
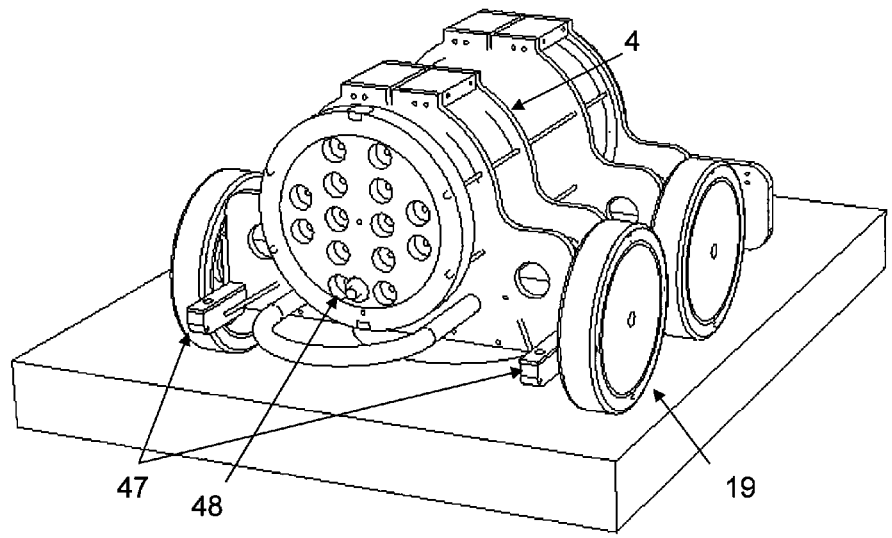
FIG. 14 illustrates one example of a HullBUG cleaning system configured with optical flow sensors.

In another embodiment, one or more optical flow sensors 47 such as, for example, the type of sensor utilized in an optical mouse, is configured to optically detect movement of the cleaning system relative to the surface 19 as shown in FIG. 14 as will be understood by one skilled in the art. Optical flow sensors 47 output data identifying the relative change in position from the previous position. This information is provided to controller 4 of the cleaning system to establish the distance traveled from the starting point. In the embodiment described here, the optics have been optimized for use in the underwater environment and configured to allow a greater standoff distance to the surface. The output of the sensor is an accurate measurement of translation on the two-dimensional plane of the ship's hull. By using two optical flow sensors, one on each side of the HullBUG, the translation information can be used to estimate rotation as well. The precise translation and rotation measurements allow for extended excursions of the Hull-BUG on the ship's hull or other underwater surface while maintaining accurate knowledge of the present position.

Figure 15:
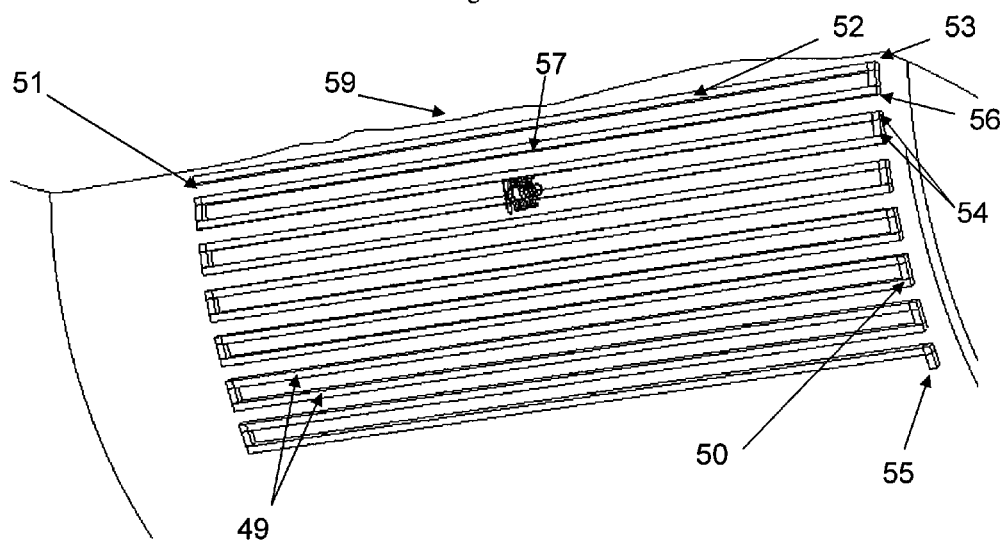
FIG. 15 illustrates one example of a HullBUG cleaning system configured with a pressure sensor for depth measurement.

A pressure sensor 48 may also be implemented and used to estimate the submerged depth of the cleaning system as shown in FIG. 14. The depth information is provided to controller 4, which uses the provided data to make the cleaning system navigate along a series of parallel paths 49 with each path following an isobar as shown in FIG. 15. In order to follow an isobar in an environment where surface waves can cause motions in the navigation, the measurement of the gravity vector using the accelerometer described below can be used as an inner control loop with the depth controller as an outer control loop; a technique understood by one skilled in the art. In addition to the pressure sensor and corresponding depth information allowing isobar following mission paths, the depth information can be used as a condition for the completion of a transit leg 50 along a navigation path that traverses a change in depth.

Figure 16:
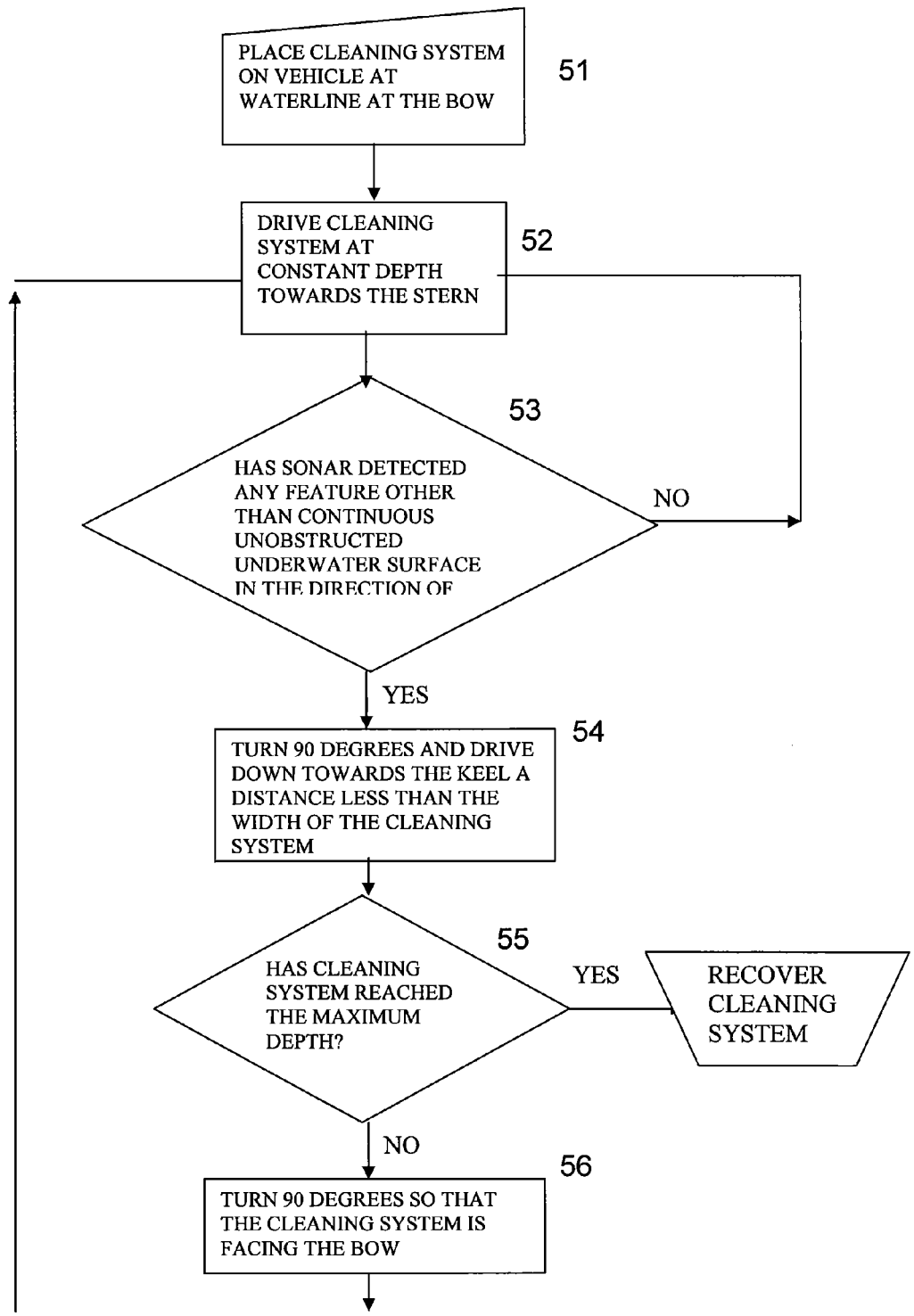
FIG. 16 is a flow chart illustrating one example of a cleaning mission using a depth sensor that may be performed by the HullBUG cleaning system.
Figure 16:
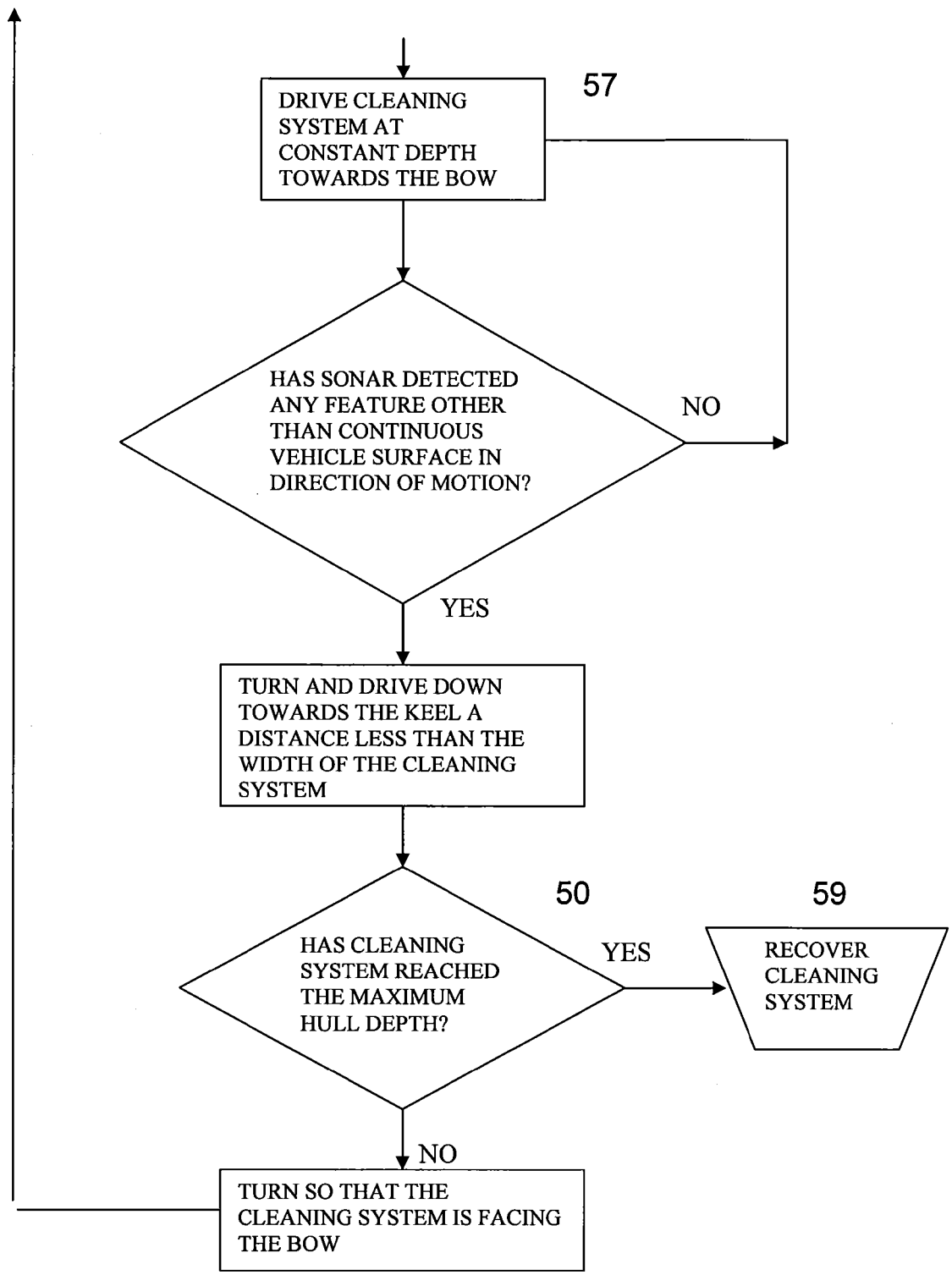

A flow chart for the control logic of controller 4 using the sensor information, such as from the pressure sensor described previously and a SONAR, to develop a complete navigation strategy for cleaning an entire ship is shown in FIG. 16. The mission begins with the operator placing the vehicle on the side of the ship at the waterline near the bow 51. The HullBUG has a pressure sensor that enables a change in ambient pressure when the HullBUG is below the surface of the water to be detected. Additionally, the pressure sensors provide signals to controller 4 that engages the attraction device and activates the propulsion system such that the Hull-BUG cleaning system is propelled along the underwater surface at a constant depth towards the stern of the ship 52. The HullBUG cleaning system continues along the isobar until the SONAR detects a feature that will prevent the continuation of the current leg of the mission such as the stern of the ship at block 53. Once the feature is detected, the HullBUG turns down towards the keel and drives a distance less than the width of the HullBUG chassis 54. The HullBUG cleaning system uses a depth measurement to check that the current depth is still less than the maximum depth of the side of the ship 55, which may be known a-priori and stored in a computer readable storage medium such as, for example, main memory 106 and/or secondary memory 108. Alternatively, the mission may be terminated using an accelerometer to measure the pitch and roll of the cleaning system and then use the change in the pitch/roll as the cleaning system reaches the turn of the bilge of a ship. The HullBUG then turns back in the direction of the bow 56 and proceeds at a depth greater than the depth of the previous leg and parallel to the previous leg 57. The HullBUG cleaning system continues in the same fashion with parallel mission legs 49 until the depth as measured by the pressure sensor indicates that the maximum safe depth has been reached 50 at which point the HullBUG cleaning system turns and drives up back to the waterline and waits for recovery 59 or relocates to the beginning of another section of the underwater surface to begin cleaning.

Figure 17:
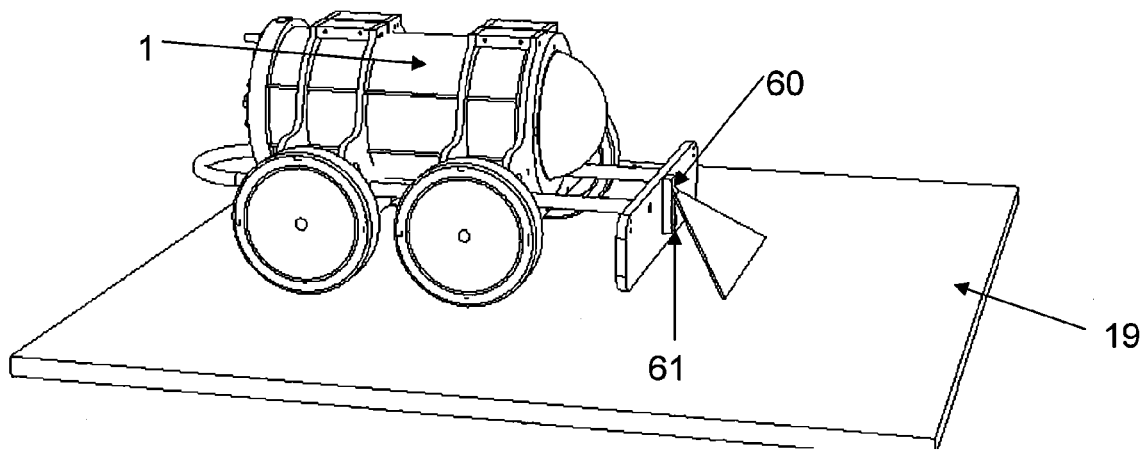
FIG. 17 illustrates one example of a HullBUG cleaning system configured with a structured laser light sensor.

In some embodiments, a structured laser light ("SLL") sensor, which includes a laser line generator 60 and an imaging sensor 61, is mounted on the periphery of the cleaning system and used to detect any feature in the path of the HullBUG cleaning system as illustrated in FIG. 17. In operation, laser line generator 60 projects a line onto the surface of the hull 19. The laser is at a shallow angle to the surface such that irregularities from a smooth straight surface will cause the line to become irregular or discontinuous. The miniature video sensor 61 images the line and signal processing techniques are used to determine the extent of the surface irregularity. The acquired surface information is analyzed by the controller 4, which makes a decision to go over or around the discovered irregularity. The SLL enables the HullBUG cleaning system to navigate around obstacles without actually having to come in contact with the obstacles. A series of the SLL sensors mounted across the front of the cleaning system and allow the optical path to be very short and results in successful operation when operating in very low visibility waters.

Figure 18:
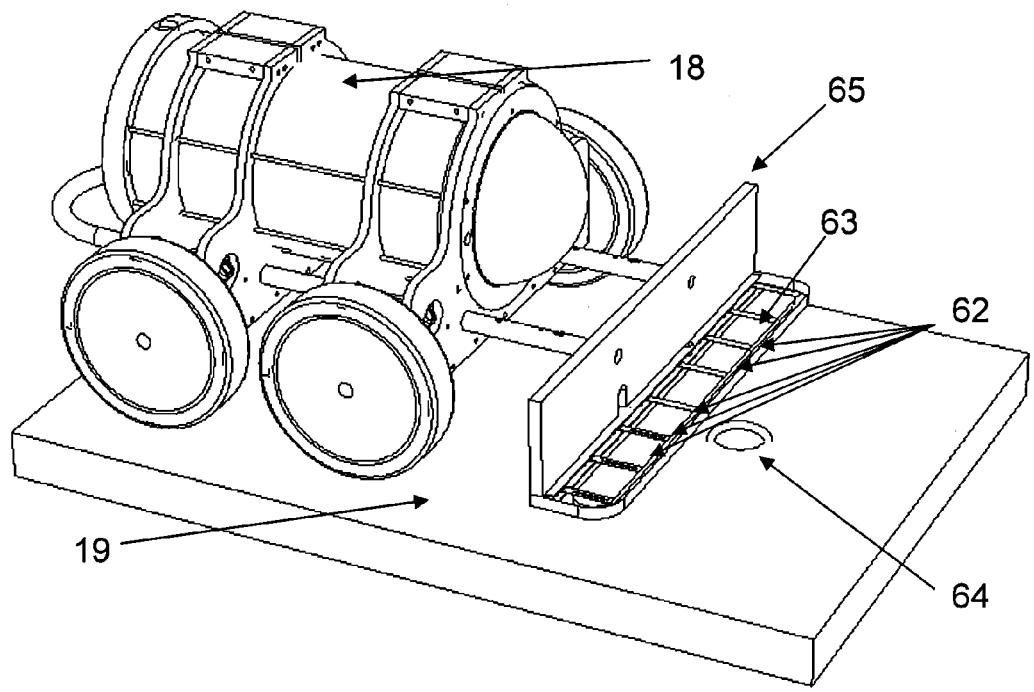
FIG. 18 illustrates one example of a HullBUG cleaning system configured with an array of flex sensors.

One or more flex sensors 62 may be provided on or around chassis 18 of the sensing system for detecting inlets and outlets 64 on the underwater surface 19 into which or out of which fluid flows as shown in FIG. 18. Flex sensors 62 provide a signal proportional to the bend direction and bend radius of the sensor to controller 4. Flex sensors 62 may be embedded in a flexible rubber matrix 63 mounted on the front 65 of the cleaning system. As the HullBUG cleaning system moves toward an inlet or outlet 64, any fluid flow causes the cantilevered rubber 63 to flex and bend the flex sensors 62. The signal from the flex sensors 62 is transmitted to controller 4, which adjusts the direction in which the cleaning system is propelled by propulsion system 3 to avoid chassis 18 passing over the inlet or outlet 64.

Figure 19:
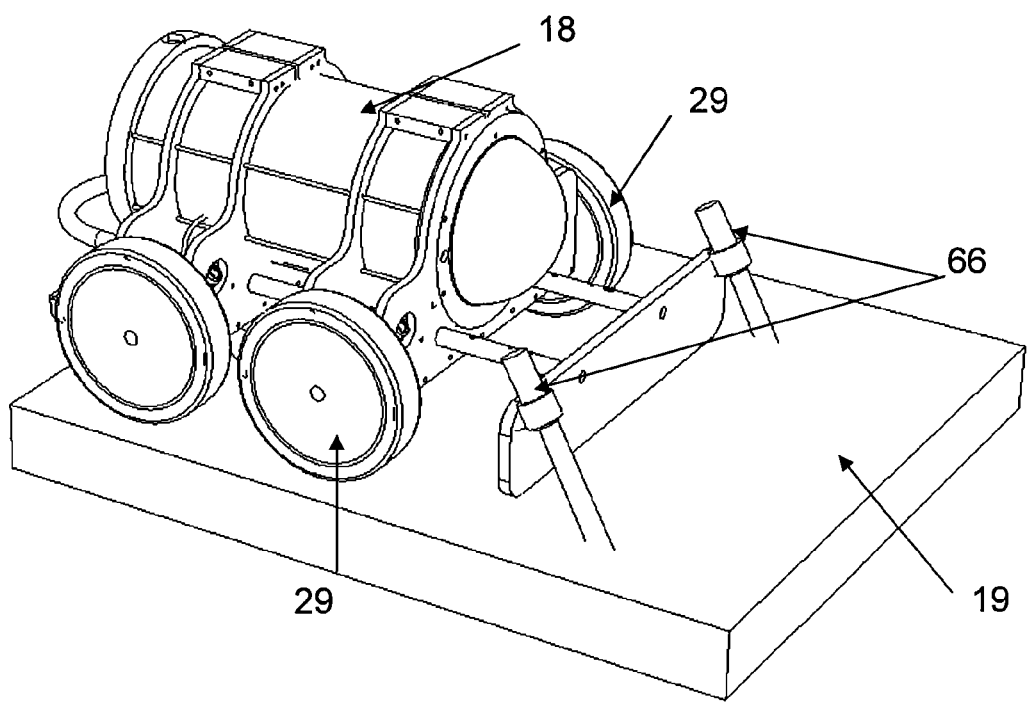
FIG. 19 illustrates one example of a HullBUG cleaning system configured with a Miniature Acoustic Ranging Sonar (MARS).

Navigation on the hull of the ship is further enhanced with the use of Miniature Acoustic Ranging Sonar ("MARS") 66 as shown in FIG. 19. The MARS is an underwater acoustic ranging SONAR that provides an accurate distance to the hull surface 19. Since MARS is acoustic in nature, the measurement is not dependant on the clarity of the water. By placing 2 or more of these sensors 66 in the front of the vehicle 65, objects or features on the hull can be detected and the vehicle can maneuver around them. These sensors provide a remote sensing so that the vehicle can stop before actual contact is made. With just a single sensor in front of each wheel 29, any holes on the surface can be detected before the wheel can fall in. For example, the SONAR sensors periodically transmit a beam of acoustic energy away from chassis 18 and receive a reflected signal (echo), which undergoes signal processing to determine the presence of and/or distance to a wall and/or cliff condition, i.e., features found on ships and liquid storage tanks such as walls, keels and rudders. The SONAR sensors output data to controller 4 including a distance to any such wall or cliff condition. If the distance to a wall or cliff condition is below predetermined threshold, controller 4 modifies the direction in which the cleaning system is propelled to avoid the wall and/or cliff condition.

Figure 20:
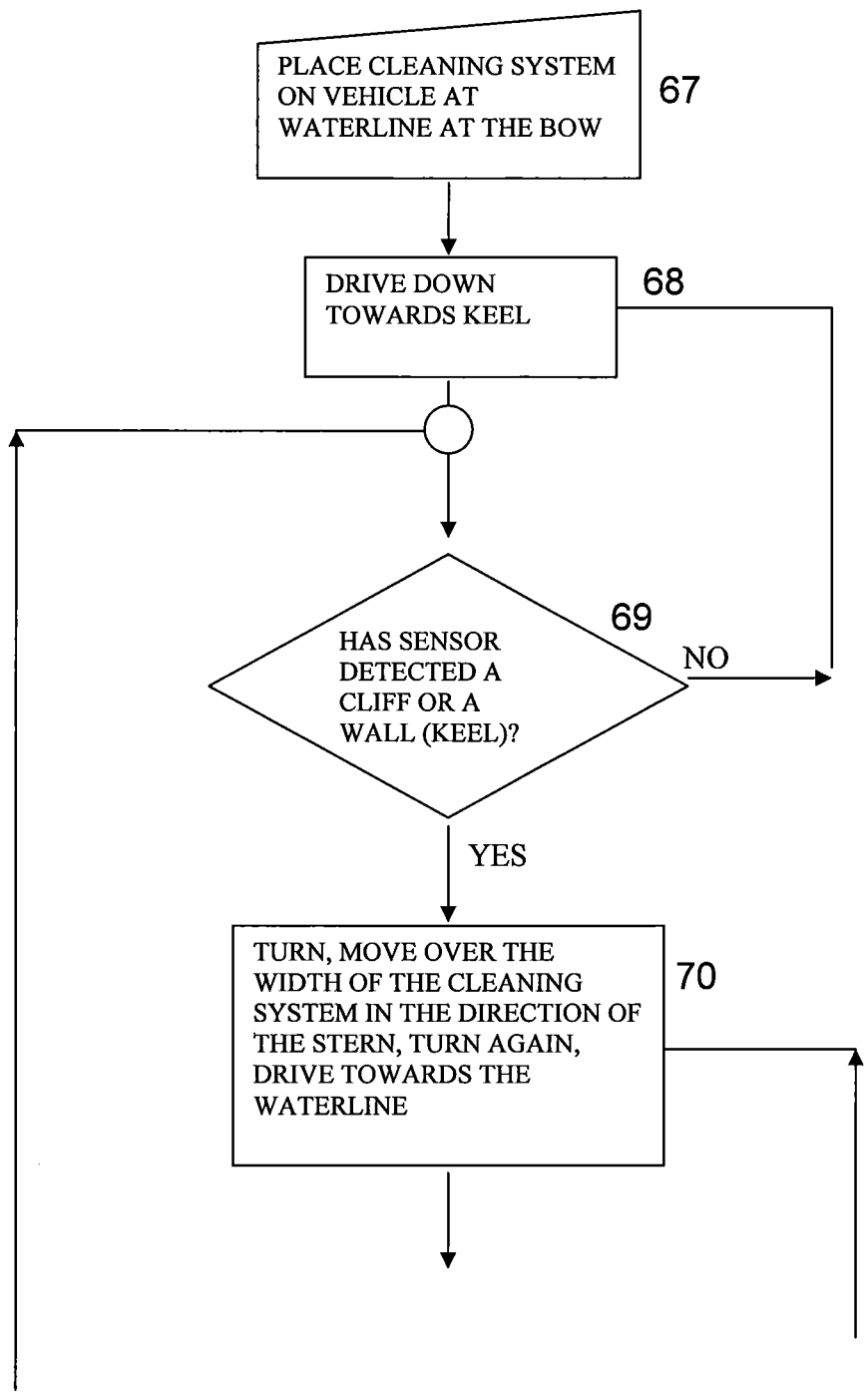
FIG. 20 is a flow chart illustrating one example of a method of sensing performed by the HullBUG cleaning system illustrated in FIG. 19.
Figure 20:
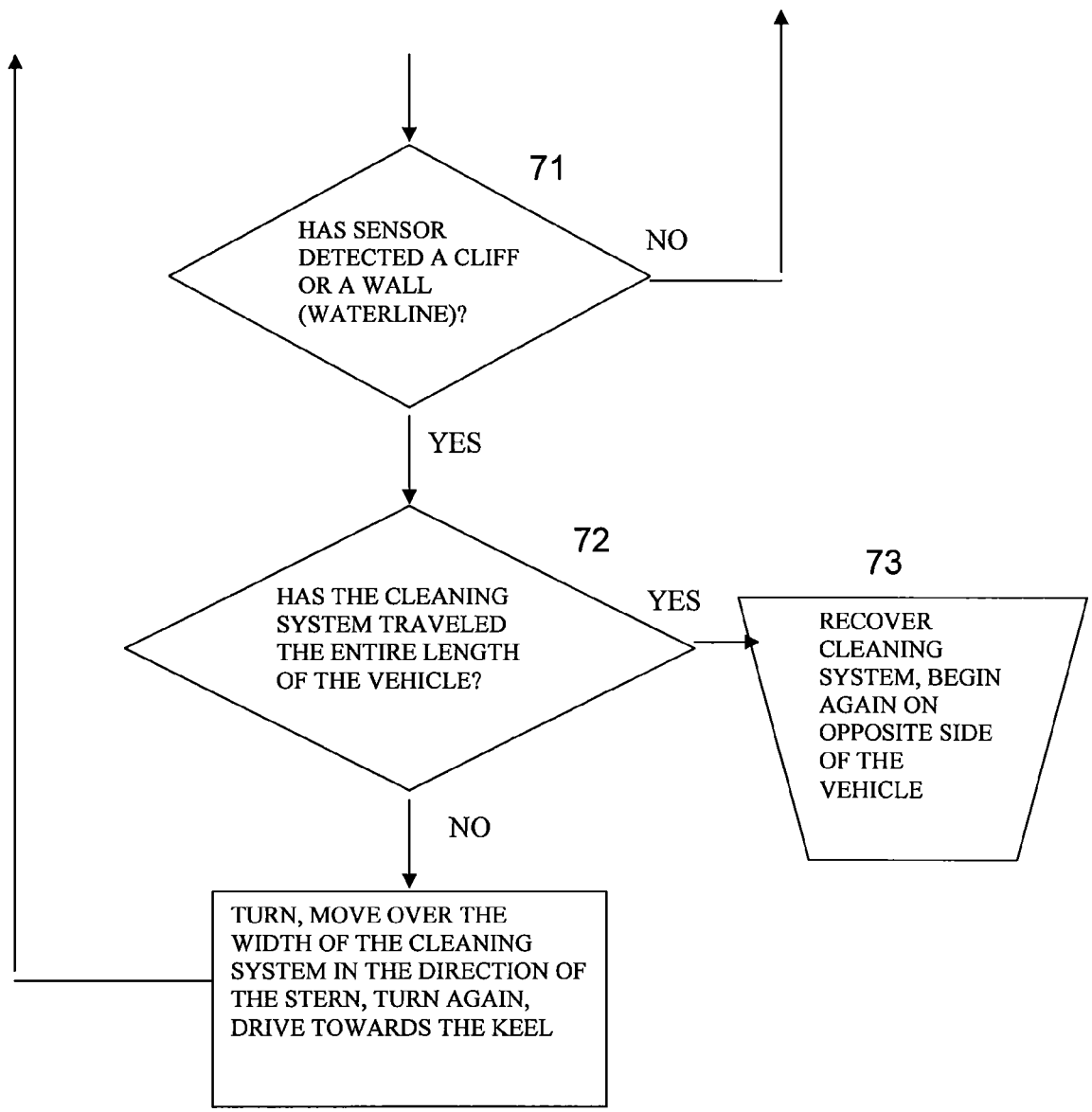

The control system in the vehicle can use sensor information such as from the MARS sensor described previously to develop a complete navigation strategy for cleaning an entire ship as shown in FIG. 20. As shown in FIG. 20, the mission begins with the operator placing the vehicle on the side of the ship at the waterline near the bow 67. The cleaning system has a three-axis accelerometer within the chassis 18 so the HullBUG can determine what direction is up and what direction is down relative to gravity. An example of a commercially available accelerometer is a model MMA726Q accelerometer available from Freescale Semiconductor of Chandler, Ariz. The HullBUG drives down from the waterline 68 until a cliff or wall condition 69 by the MARS sensors 66. The vehicle then turns 90 degrees (or another angle as will be understood by one skilled in the art) towards the stern and drives a distance of something less than the width of the HullBUG and then turns back towards the waterline 70. The HullBUG cleaning system then drives up towards the waterline where the free surface of the water appears as a wall to an acoustic beam 71. The HullBUG continues in the same fashion with parallel mission legs until the stern is seen as a cliff condition and the mission is completed 72 at which point the HullBUG cleaning system turns and drives up back to the waterline and waits for recovery 73. The HullBUG can then be placed on the opposite side of the ship and the procedure repeated resulting in the cleaning of the entire ship.

Figure 21:
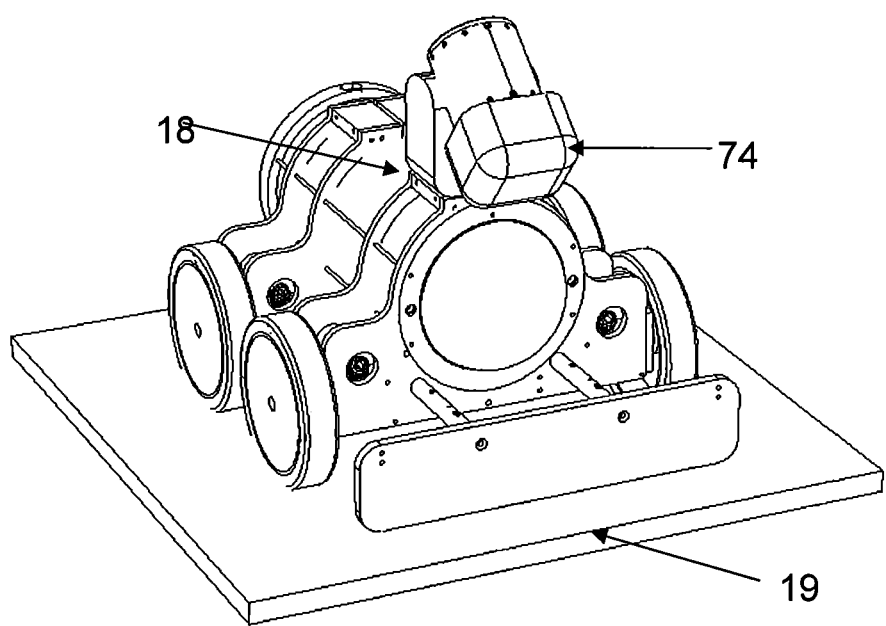
FIG. 21 illustrates one example of a HullBUG cleaning system configured with an imaging or bathymetric SONAR.
Figure 22:
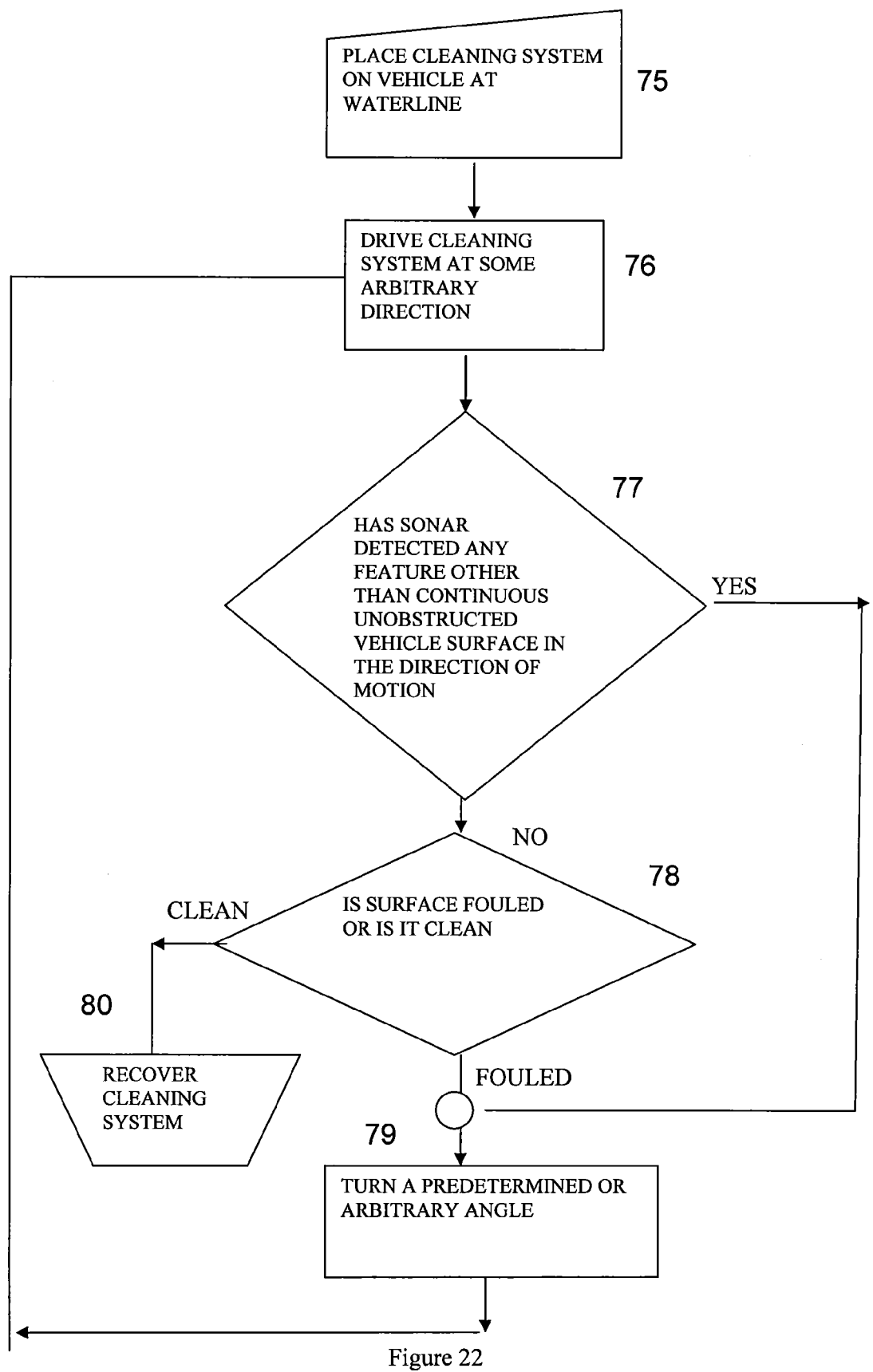
FIG. 22 is a flow chart of controller using SONAR and a biofilm sensor.

In addition to the features described above, additional and somewhat more geometrically complex features such as anodes and cavities may be disposed on surface 19. An imaging or bathymetric SONAR 74 may be implemented and used to detect these features and the previously described features as shown in FIG. 21. FIG. 22 is a flow chart illustrating the logic that the controller will use to implement the SONAR sensor and biofilm sensor. As shown in FIG. 22, the mission begins with the operator placing the cleaning system on the side of the ship at the waterline 75. The HullBUG drives in a direction (in some embodiments and arbitrary direction) 76 until the SONAR detects some obstruction to the progress of the mission leg 77. The cleaning system then turns at an arbitrary or fixed angle 79 and proceeds until once again the SONAR detects some obstruction 77. The HullBUG continues in the same fashion repeatedly until the biofilm sensor 43 no longer detects the presence of a biofilm 38 on the hull surface 19 and the mission is completed 72 at which point the HullBUG turns and drives up back to the waterline and waits for recovery 80 or the start of a new section.

The use of an intelligent camera system 81 may assist in maintaining the positional accuracy as the HullBUG cleaning system navigates along an underwater surface. A camera system 81 or a SONAR system 74 enables feature recognition and thereby allows the absolute position to be updated. In this manner, positional accuracy can be maintained through periodic corrections. Software stored in a computer readable storage medium, such as, for example, main memory 106 and/or secondary memory 108 in communication with processor 102 of controller 4, may be used to identify such features. One example of such software is ImageGraphics Video available from Dynamic Ventures of Cupertino, Calif.

The feature data will be useful even if the visibility is less than a foot. For example, in some embodiments, when the flex sensors 62 hit some feature 82 and cause the vehicle to stop, the camera may be less than four inches away from the feature and able to identify the feature. With the feature recognized, the HullBUG cleaning system can accurately update its position on the surface. Where visibility is on the order of a few feet or greater, features such as weld lines 83 in the hull can be used as a navigation grid on the hull of the ship. Other features that may augment navigation through the use of the vision system include anodes, intakes, bilge keels, and masker belts.

Figure 23:
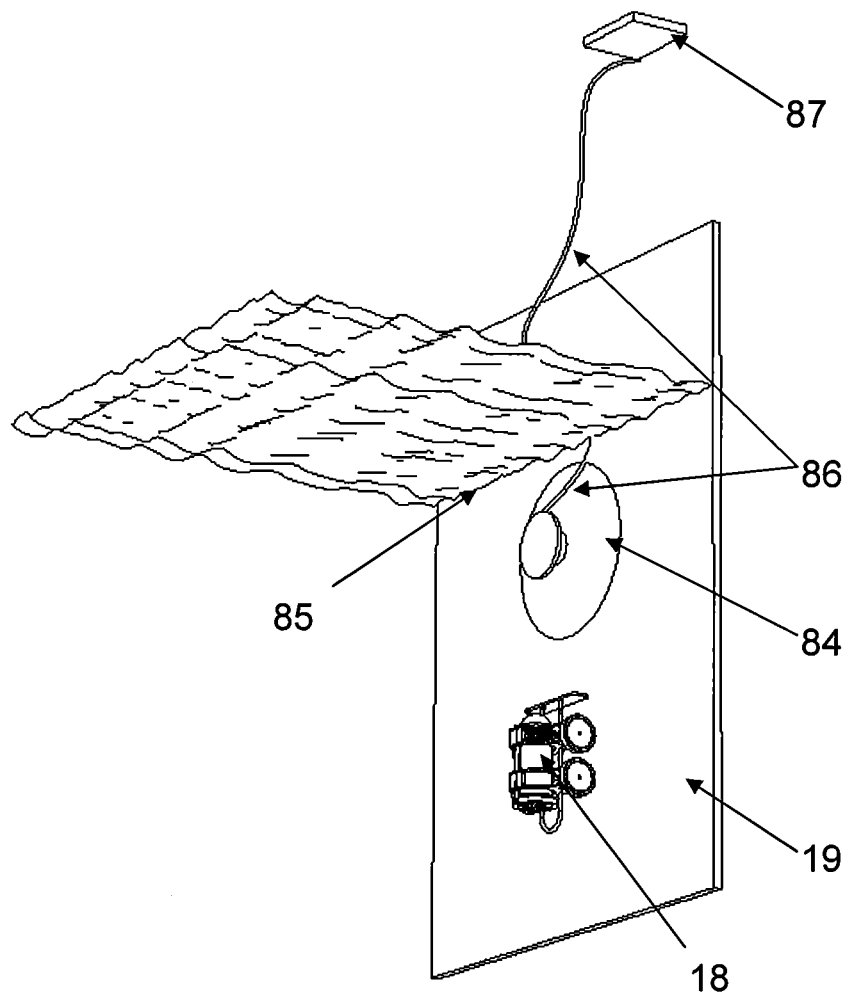
FIG. 23 illustrates a HullBUG cleaning system and its associated replenishment station.

When used in an autonomous mode, the HullBUG cleaning system can be used with a replenishment station 84 attached to the hull surface 19 slightly below the waterline 85 as shown in FIG. 23. This replenishment station is tethered 86 to the surface control station 87 and allows bi-directional data communication with the HullBUG along with the ability to recharge on-board energy storage 5. The HullBUG cleaning system can return to the station using an acoustic sensor system 88 that is commercially available for such applications. One example of such an acoustic sensor system is a DPR-275 receiver and UPB-350 pinger, which are both available from RJE International of Irvine, Calif.

One skilled in the art will understand that the cleaning system described above may be implemented with some or all of the sensor and cleaning systems to provide a high degree of positional accuracy of the cleaning system on the surface. Additionally, the sensor systems enable the HullBUG cleaning system to detect and avoid potential obstacles along the surface as well as enable the cleaning system to detect biofouling on the surface. Other sensors including, but not limited to, yaw rate sensors, an odometer, and Doppler sensor may also be included in the HullBUG cleaning system.

In addition to be used to clean the underwater surface, the HullBUG may also be used to inspect the underwater surface and determine if it needs to be cleaned. For example, the HullBUG may periodically navigate the underwater surface based on a predetermined schedule to determine if cleaning is necessary. The predetermined schedule may be based on fouling pressure, ambient water temperature, available sunlight, surface coating type, amount of time a ship or surface to be cleaned is mobile, speed of ship, speed of surrounding water currents, and the like. The article "The use of proactive in-water grooming to improve the performance of ship hull antifouling coatings", by Tribou et al., the entirety of which is herein incorporated by reference, describes how such factors may be taken into account to determine a cleaning schedule. If cleaning is necessary, then the HullBUG may clean the surface as described above. If the HullBUG determines that cleaning is not necessary, then it may return to its replenishment station and schedule a follow-up inspection after a certain time interval, e.g., in another few hours, days, weeks, etc. When the HullBUG performs its follow-up inspection, it will determine if cleaning is necessary by measuring a fouling level, which may be based on a chlorophyll level detected by the sensors described above. If cleaning is necessary, then the HullBUG cleaning system may update its time between scheduled inspection/cleaning times.

The systems and methods disclosed herein may be at least partially embodied in the form of computer-implemented processes and apparatus for practicing those processes. The methods described herein may also be at least partially embodied in the form of computer program code embodied in tangible machine readable storage media, such as RAMs, ROMs, CD-ROMs, DVD-ROMs, BD-ROMs, hard disk drives, flash memories, or any other machine-readable storage medium, wherein, when the computer program code is loaded into and executed by a computer, the computer becomes an apparatus for practicing the method. When implemented on a general-purpose processor, the computer program code segments configure the processor to create specific logic circuits. The disclosed systems and methods may alternatively be at least partially embodied in a digital signal processor formed of application specific integrated circuits ("ASICs") for performing a method according to the principles described herein.

Although the system and method have been described in terms of exemplary embodiments, they are not limited thereto. Rather, the appended claims should be construed broadly, to include other variants and embodiments of the system and method, which may be made by those skilled in the art without departing from the scope and range of equivalents of the system and method. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:

1. A method of cleaning fouling from a surface of a hull disposed under a surface of a liquid, comprising:
   a) determining a first frequency with which to clean a surface of the hull;
   b) coupling a cleaning system to the surface of the hull, wherein the cleaning system includes a chassis supporting a propulsion system; propelling the cleaning system across a surface; sensing an attribute of the surface with at least one sensor coupled to the chassis; maintaining the cleaning system coupled to the surface as the propulsion system propels the cleaning system across the surface; operating a cleaning device coupled to the chassis to abrade the fouling from the surface; and controlling the cleaning system by signaling between the at least one sensor, a controller coupled to the at least one sensor and the propulsion system;
   c) powering on the cleaning system; and
   d) repeating steps b) and c) in accordance with the first frequency.

2. The method of claim 1, wherein the first frequency is based on at least one of a coating on the surface, an average temperature of the liquid, and a fouling pressure.

3. The method of claim 1, further comprising:
   e) determining a second frequency with which to clean a surface of a the hull;
   f) repeating steps b) and c) in accordance with the second frequency; and
   g) modifying the second frequency based on a level of growth of the fouling on the hull to provide the first frequency.

4. The method of claim 1, comprising operating a plurality of said cleaning systems while coupled to the surface of the hull and powered on.

5. The method of claim 1, wherein said maintaining the cleaning system coupled to the surface comprises magnetic attraction.

6. The method of claim 5, wherein the magnetic attraction includes attraction to at least one magnet disposed within a wheel of the propulsion system.

7. The method of claim 1, wherein said maintaining the cleaning system coupled to the surface comprises reducing pressure in the liquid between the surface and an underside of the chassis compared to a pressure at an upper side of the chassis whereby the chassis clings to the surface.

8. The method of claim 1, comprising illuminating the surface with a light source, and wherein the at least one sensor is responsive to a level of chlorophyll present in a biofilm on the surface.

9. The method of claim 1, comprising operating the at least one sensor to detect a fouling on the surface.

10. The method of claim 1, wherein the signaling is at least partly wireless communication.

11. The method of claim 1, further comprising sensing at least one of: movement of the cleaning system relative to the surface; change in pressure in the liquid; and change in flow at a peripheral surface of the chassis;
   transmitting sensing signals to the controller; and controlling the propulsion system in response thereto.

12. The method of claim 11, further comprising sensing an irregularity of the surface at a distance from the at least one sensor, wherein the irregularity is one of a wall, a cliff, and a chine.

13. The method of claim 1, further comprising acoustically ranging to echo locate one of an object and an irregularity disposed in front of the chassis and operating the controller in response thereto.

14. The method of claim 1, wherein the surface is an underwater surface of a hull of a vehicle.

15. The method of claim 1, wherein the sensing includes operating at least one of a depth sensor, a yaw rate sensor, an accelerometer, an odometer, and a Doppler sensor.

16. The method of claim 1, wherein operating the cleaning device includes running at least one of a squeegee, a brush, and a jet.

17. A method of cleaning a surface of a hull disposed under a surface of a liquid, comprising:
 a) maintaining a cleaning device coupled to a chassis in contact with the surface of the hull using a surface engagement mechanism supported by the chassis;
 b) propelling the chassis across the surface of the hull by a propulsion system supported by the chassis;
 c) abrading the surface of the hull with a cleaning device coupled to the chassis;
 d) sensing a level of chlorophyll on the surface of the hull;
 e) determining a level of fouling based on the level of chlorophyll; and
 f) modifying at least one of said propelling and said abrading based on the level of fouling.

18. The method of claim 17, further comprising:
 g) determining a frequency with which to clean the surface of the hull based on the level of fouling and a period of time between consecutive cleanings; and
 h) cleaning the surface of the hull in accordance with the frequency.

* * * * *